United States Patent [19]

Larsen et al.

[11] Patent Number: 5,589,207
[45] Date of Patent: Dec. 31, 1996

[54] METHOD OF PRODUCING A FROZEN YEAST DOUGH PRODUCT

[75] Inventors: Peter Larsen, deceased, late of Nice, France; Henrik S. Pedersen, executor, Birkerod, Denmark

[73] Assignee: Kval Marketing Inc., Petaluma, Calif.

[21] Appl. No.: 479,813

[22] Filed: Jun. 7, 1995

(Under 37 CFR 1.47)

Related U.S. Application Data

[63] Continuation of Ser. No. 268,069, Jun. 28, 1994, abandoned, which is a continuation of Ser. No. 777,525, Jul. 11, 1990, filed as PCT/DK90/00183, published as WO91/01088, Feb. 7, 1991, abandoned.

[30] Foreign Application Priority Data

Jul. 14, 1989 [DK] Denmark .................................. 3489/89

[51] Int. Cl.$^6$ ..................................................... A21D 8/04
[52] U.S. Cl. ................................ 426/20; 426/28; 426/62; 426/549; 426/556
[58] Field of Search ................................ 426/19, 20, 62, 426/556, 549, 28

[56] References Cited

U.S. PATENT DOCUMENTS

| | | | |
|---|---|---|---|
| 4,248,896 | 2/1981 | Wallace | 426/19 |
| 4,374,151 | 2/1983 | Lindstrom et al. | 426/19 |
| 4,406,911 | 9/1983 | Larson | 426/19 |
| 4,847,104 | 7/1989 | Benjamin et al. | 426/549 |
| 5,171,590 | 12/1992 | Sluimer | 426/19 |
| 5,254,351 | 10/1993 | de Boer et al. | 426/62 |

FOREIGN PATENT DOCUMENTS 2481072  10/1981  France.

OTHER PUBLICATIONS

James Beard's American Cookery, 1972, Lutte Brown and Co.; Boston, pp. 776–777.

Woman's Day Encyclopedia of Cookery, vol. 8, Tighe Editor, 1966, Fawcett Publications, Inc.: New York, p. 1302.

Montagné, Larousse Gastronomique, 1961, Crown Publishers, Inc.: New York, pp. 351–353.

Enzyme Treatment of Flour, A. Himmelstein, Bakers Digest, Sep. 11, 1984, pp. 8–12.

Enzymes in Baking, III. Products, D. DuBois, American Institute of Baking Technical Bulletin vol. II Issue 12, Dec., 1980, pp. 1–5.

Enzymes in Baking, II. Applications, D. DuBois American Institute of Baking Technical Bulletin vol. II, Issue 11, Nov. 1980, pp. 1–16.

*Primary Examiner*—Arthur L. Corbin
*Attorney, Agent, or Firm*—Corwin R. Horton

[57] ABSTRACT

Leavened yeast dough products obtain a long durability in a frozen condition by omitting using in the preparation thereof fermentable carbohydrates, but the formation in situ of such fermentable carbohydrates satisfactory to leaven the dough is ensured by adding one or more amylases to the dough. Upon freezing the activity of the amylase ceases and the concentration of fermentable carbohydrates falls to such a low value that the proteinase forming activity of the yeast actually ceases. A possibly desired brown-coloring of the baked product may be ensured by the addition of amylases with an activity at a relatively high temperature.

28 Claims, No Drawings

METHOD OF PRODUCING A FROZEN YEAST DOUGH PRODUCT

This is a continuation of application Ser. No. 08/268,069, filed Jun. 28, 1994, now abandoned, and, in turn, a continuation of application Ser. No. 07/777,525, filed Sep. 15, 1992, now abandoned, and of International Application PCT/DE90/00183, filed Jul. 11, 1990, and which designated the U.S.

The invention relates to a method of preparing a frozen yeast dough product, e.g. for the production of Danish pastry, croissants and the like, by mixing flour, water, enzymes and possibly other conventional dough ingredients and rolling, forming and freezing the mixed dough, and particularly to such a dough product to which conventionally is added fermentable carbohydrates. Fermentable mono- or disaccharides are sometimes more generically characterized as "fermentable carbohydrates" or, as used herein, "fermentable carbon hydrates."

For obvious reasons there is a need for a leavened yeast dough product that may be marketed when frozen and having a long shelf life in frozen condition and which may be baked by retailers, restaurants, cafe's etc. or by the consumers themselves, without first thawing out and leavening the dough. To be satisfactory the product so produced should have a look and organoleptic properties corresponding to those obtained by conventional baking methods, i.e. in which the baking is effected immediately after the dough has been leavened without any intermediary freezing of the dough.

A long series of experiments has been carried out to fulfill said need. However, it has turned out to be particularly difficult to obtain satisfactory results if the dough product to be frozen contain yeast, and particularly if said yeast when the freezing is performed has a high activity level which is the case with a leavened dough.

It has actually turned out that such yeast dough products when consisting of the hitherto used ingredients only, are stored when frozen for no more than a few months, and generally for a considerably shorter time, will produce no commercially acceptable product upon baking because of structural or textural changes.

Various methods have been suggested of increasing the shelf life of frozen dough products in general. Thus, U.S. Pat. No. 4,847,104 suggests using flour with more than 16% of wheat protein, calculated on the total flour content of the dough. It is stated that such a protein content may provide for obtaining a shelf life also of leavened, frozen yeast dough products for at least 16 weeks. However, the use of flour mixtures of selected types, particularly rich in proteins or with the addition of particularly gluten-containing products, entails an increase of the costs and implies certain restrictions with respect to the organoleptic properties of the final products. Moreover, the improvement of the stability obtained even by the example of the patent specification, is insufficient in connection with leavened yeast dough products.

Other methods have been suggested for the restriction of the undesired structural change, dough products are being subjected to by freezing and cold storage. Thus, FR patent No. 2 481 072 deals with practicing special temperatures for the rising combined with very low freezing temperatures between −180° and −100° C. Such a low freezing temperature only offers satisfactory results, provided the following storing be effected at temperatures lower than those practically coming into consideration.

U.S. Pat. Nos. 4,374,151 and 4,406,911 suggest adding to the dough to be frozen considerable quantities of melting point lowering agents and hydrophile colloids, film-forming proteins and surfactants. Such additions are particularly effected with the view of obtaining a good rising in connection with the first part of the baking "oven spring" and the results stated in said references do not reflect any particularly long durability of the frozen products.

It has been proposed to apply different enzymes in the preparation of dough to change the properties of the final products in a desired direction. It has for example been proposed to apply amylases in amounts of from less than 1 g to some few grams per 100 kg flour in order to obtain a darker crust and to increase the amount of fermentable carbohydrates in frozen dough products to obtain a more effective proofing thereof after thawing.

According to an article by A. Himmelstein: "Enzyme treatment of flour", Bakers Digest, Sep. 11, 1984, pages 8–12, the quality of frozen or retarded dough products may be improved by selecting a flour containing very few natural enzymes and adding fungal amylases that have special enzymatic side activities and become inactive at relating low temperature. However, the use of enzymes in yeast dough to be subjected to leavening followed by freezing has not been suggested and it well known that addition of enzymes to a dough incorporating fermentable mono- and disaccharides does not result in a dough which after having leavening can be frozen to a product of satisfactory shelf life. Therefore, successful application of freezing in the baking industry has hitherto essentially been restricted to freezing of the dough to be leavened after thawing or to products which are at least partially baked.

It has now turned out that a leavened yeast dough product having a longer durability when frozen than what applies to prior art leavened frozen yeast dough products may be obtained by a method which according to the invention is characterized in that fermentable mono- or disaccharides, which would conventionally be used in the preparation of the dough, are replaced by at least one amylase which is substantially inactive at temperatures below 0° C. in an amount which by decomposition of starch available in the flour generates fermentable carbohydrates in a concentration sufficient to ensure the leavening of the dough product. The dough product after forming is made to rise and subsequently subjected to freezing.

The term amylase is in this respect used for enzymes which in suitable circumstances decompose gelatinized or mechanically degraded starch by the generation of considerable amounts of fermentable carbohydrates, said enzymes comprising both alpha and beta amylases and amyloglucosidases.

The invention is not restricted by any theory as to the reason why a frozen product with a very high durability is obtained by the method just described. It is, however, supposed that the predominant reason why conventional yeast dough products after rising only have a short durability when frozen consists in that the proteinases of the yeast decompose the structure or texture forming proteinaceus substances, in particular gluten, also at temperatures at which frozen food products are generally stored, i.e. between −18° C. and −25° C., but that this activity is particularly efficient when fermentable sorts of sugar are available for the yeast in a certain amount. However, when the amount of fermentable carbohydrates is below a certain level, the activity of the yeast at the temperatures in question is so low that the yeast will not form considerable amounts of extracellular proteinase attacking the gluten.

By omitting the addition of fermentable carbohydrate, e.g. in the form of saccharose, glucose or maltose (available in malt flour or in malt extract), by the method according to the invention, but by adding instead amylase, there is formed fermentable carbohydrates in the dough in an amount sufficient to insure a yeast activity satisfactory to obtain the desired leavening, but these fermentable carbohydrates formed by the amylase are consumed approximately at the same rate as formed, and when the leavened yeast product is frozen the activity of the amylase ceases, following which there will be no substantial amounts of fermentable carbohydrate available in the dough, thereby causing the activity of the yeast cells to almost cease so that they only to a very small degree liberate gluten decomposing proteinases.

Yeast dough products produced by the method according to the invention have been stored in frozen condition for more than one year, but nevertheless after baking they resulted in products, particularly of the Danish pasty type, that were commercially acceptable. Professionals have hitherto taken for impossible to obtain such a long freeze preservation for leavened yeast dough products.

Amylases of the type coming into consideration with respect to the method according to the invention are preferably of a fungal origin. Such amylases are commercially available with activity within various ranges of temperatures and with different thermostability.

If an amylase active up to a temperature of 50° to 55° C. is the only added enzyme, active yeast will be present in the dough during the first part of the baking nearly until the amylase becomes inactive and production of fermentable carbohydrate ceases. The fermentable carbohydrate produced will therefore be consumed to a substantial degree by the yeast and the amount present in the dough upon reaching the temperatures at which the formation of a colored crust takes place will be small.

In view of the fact that the formation of a satisfactory brownish crust requires the presence of monosaccharides or reducing disaccharides participating in a Maillard-reaction the crust will, in such cases, appear too pale, and the invention therefore further relates to the preparation of a yeast dough product which, upon baking, assumes a desired brown coloring by the addition to the dough preparation of an amylase enzyme which maintains its activity for the decomposition of starch to fermentable carbohydrates at temperatures above 55° to 60° C., but which becomes inactive at temperatures above 80° to 85° C. The use of such enzyme of higher heat stability, preferably amyloglucosidase, ensures formation of monosaccharides after the yeast activity has ceased to be available for the crust coloring reactions It is important that the amyloglucosidase is inactivated when the temperature exceeds 80° to 85° C. since no remaining enzymatic activity is desired in the final baked product. However, even if some enzymatic activity should be present in the baked product this is not regarded as involving any health risk.

The final product thus has a "natural" composition without the addition of chemical preservatives, contrary to what applies to the products obtained by certain of the above described prior methods.

The method according to the invention has been tested, in particular, in connection with the preparation of Danish pastry, croissants and the like, and incorporating, instead of fermentable carbohydrates, an amylase that becomes inactive by heating to 55° to 60° C. and, an amylase which is an amylogluosidase that becomes inactive only at 80° to 85° C.

The amounts of enzymes to be used obviously vary, inter alia in dependence on their activity. Tests reflect that the amylase which becomes inactive at 55° to 60° C. is to be used in an amount of at least 3500 SKB units per kg of flour and the amyloglucosidase in an amount of at least 60 AGU per kg of flour. The unit SKB, and abbreviation of Sandstedt, Kneen and Blish, corresponds to 1/35 FAU (Fungal Amylase Unit) and is determined by comparing with an enzyme standard. The unit AGU is defined as the amount of enzyme which hydrolyzes 1 micro-mol maltose for a half hour at pH 4.3 and 25° C.

A series of satisfactory experiments has been carried out by incorporating in the dough product the enzyme "Fungamyl®" MG 35000 together with the enzyme AMG 300 MG. Both of said enzymes are marked by Novo-Nordisk, Copenhagen, Denmark. Fungamyl is declared to be active up to 55° to 60° C., while AMG is active up to 80° to 85° C., i.e. at a temperature exceeding the temperature at which a gelatinization of the starch of the flour sets in. Due to the fact that the gelatinized starch is easily attacked by the heat resisting amylase there is obtained in this stage where the presence of mono- and disaccharides is desired in respect of the color and taste of the product, a strong formation of such saccharides. However, the negative effect with respect to durability of the frozen dough product occurring by the addition of mono- or disaccharides during the dough preparation in conventional methods is eliminated.

In a preferred embodiment of the method with the view of preparing frozen products to be baked as Danish pastry products and the like, 0.05 to 0.1% by weight of Fungamyl MG 35000 and 0.1 to 0.2% by weight of AMG 300 MG are incorporated in the dough products, in both cases calculated on the weight of flour.

These quantities of said two enzymes are about 100 times larger than the quantities coming into consideration in the application hitherto practiced of such enzymes in bakery articles. In said prior applications use is made of Fungaml MG 35000, an alpha amylase, to lower the fall number in strong flour. Said enzyme is produced by the mold fungus *Aspergillus orzyae* and decomposes the starch to dextrines and fermentable carbohydrates. The enzyme AMG 300 is an amyloglucosidase extracted from the mould fungus *Aspergillus niger* decomposing starch and dextrines into glucose that participates in the brown-coloring Maillard reactions.

It has hitherto been considered essential to add fermentable carbohydrates in the form of mono- or disaccharides, to such as cold-rolled fat containing doughs for Danish pastry, croissant and the like. However, it is possible to obtain a satisfactory leavening of the dough products at the ordinary rising temperature, i.e. 30° to 37° C. only with the addition of enzymes as stated. At this temperature fermentable carbohydrates are obtained in a sufficient amount for yeast propagation and $CO_2$-generation for rising the dough blank. When the leavening period has elapsed and the temperature is lowered to less than 0° C. the yeast activity will almost completely stop when the fermentable carbohydrates have been consumed by the yeast, and that is the reason why the leavened or risen yeast product may be stored for a long time, e.g. at −18° C. as explained above.

When said frozen yeast products are to be used they are put into the oven in a frozen condition, e.g. at 220° C. The thawing setting in step with the baking, effects a decomposition of a limited portion of the starch into fermentable sorts of sugar, e.g. by the enzyme Fungamyl, in particular in the temperature range from 27° to 55° C., in which temperature range leavening or proofing occurs. At about 55° C. the yeast cells die and the carbohydrates, in particular glucose produced by the heat resistant enzyme, e.g. AMG, while the internal temperature of the product rises to 80° to 85° C. and the starch partially gelatinizes, serve to impart to the final bakery product a suitable color and taste.

The invention will now be illustrated in detail by the following examples and examples of comparison.

EXAMPLE 1

A Danish pastry dough was prepared by mechanical kneading of the following ingredients:

| Flour | 2200 g |
|---|---|
| Water | 900 g |
| Egg | 500 g |
| Yeast | 175 g |
| Fat | 80 g |
| AMG 300 Mg | 4 g |
| "Fungamyl ®" Mg 35000 | 2 g |

The dough was kneaded for four minutes, following which it rested for 5° C.

For rolling in 1600 g margarine was used and the rolling was effected in an ordinary manner, using three-doubled folding three times, thereby obtaining a total of 27 layers. After a rest period of 15 minutes and forming the dough, it was made to rise at 35° C. for 40 minutes at a relative air humidity of 80 to 85%. The dough was then subjected to freezing at −24° C.

To test the durability of the frozen leavened yeast dough products, test bakings were effected 7 days and 28 days, respectively, after the freezing.

The test bakings were carried out in an oven at 220° C. for 12 minutes.

To determine the change of volume by baking, the volume was determined by the frozen dough blanks prior to baking and by the finished Danish pastry immediately after baking. The baking result was moreover visually and organoleptically evaluated.

The following results were obtained:

|  | Volume: | | |
|---|---|---|---|
|  | Before baking | After baking | Increase |
| After 7 days | 120 cm$^3$ | 390 cm$^3$ | 225% |
| After 28 days | 77 cm$^3$ | 219 cm$^3$ | 184% |

In view of the fact that it has turned out in practice that by this type of Danish pastry the best bakery result is obtained when the volume increase by the baking ranges from 100 to 300%, calculated on the volume of the dough blank when put in the oven, the above results are absolutely satisfactory and the obtained Danish pastry presented in all respects the same quality as Danish pastry produced from a fresh non-frozen dough.

EXAMPLE OF COMPARISON 1

Exactly the same procedure was practised as in the above Example 1 with the variation that the two enzymes AMG 300 Mg and "Fungamyl®" Mg 35000 were omitted from the dough mixture which was instead mixed with 150 g sugar (corresponding to 6.8% of the flour weight) and 30 g salt.

Thus, the composition of the dough was in all respects in conformity with the conventional recipe of Danish pastry preparation of the type in question.

The following results were obtained:

|  | Volume: | | |
|---|---|---|---|
|  | Before baking | After baking | Increase |
| After 7 days | 190 cm$^3$ (2 pieces) | 300 cm$^3$ (2 pieces) | 58% |
| After 28 days | 102 cm$^3$ | 159 cm$^3$ | 56% |

As it appears, the volume increase obtained by the baking was considerably smaller than was the case in the above Example 1 and considerably smaller than considered desirable. The resulting Danish pastry thus had not obtained the desired size and moreover presented unsatisfactory organoleptical properties.

EXAMPLE 2

A dough for another similar bakery product, in Danish termed "smorbirkes" because it is sprinkled with poppy seeds, was prepared from the following ingredients:

| Water | 1350 g |
|---|---|
| Yeast | 250 g |
| Egg | 150 g |
| Fat | 200 g |
| AMG 300 Mg | 2 g |
| "Fungamyl ®" Mg 35000 | 1 g |
| Flour | 2550 g |

The dough was kneaded mechanically for six minutes, following which it rested for 15 minutes at 5° C. and was rolled with 920 g margarine to obtain a laminated dough consisting of 27 layers. Then the dough rested for 30 minutes and after forming the dough it was leavened at 34° C. for 30 minutes at a relative air humidity of 85%.

The freezing temperature was −30° C.

Test baking were carried out after 7 days and after 28 days.

The following results were obtained by the volume determinations:

|  | Volume: | | |
|---|---|---|---|
|  | Before baking | After baking | Increase |
| After 7 days | 100 cm$^3$ | 158 cm$^3$ | 58% |
| After 21 days | 140 cm$^3$ | 200 cm$^3$ | 43% |
| After 28 days | 192 cm$^3$ | 300 cm$^3$ | 56% |

The final product was in all respects satisfactory and corresponded to commercial products prepared from non-frozen dough.

EXAMPLE OF COMPARISON 2

Exactly the same procedure was practiced as in the above Example 2 with the variation that the two enzymes (AMG 300 Mg and "Fungamyl®" Mg 35000) were canceled from the dough mixture which was instead mixed with 75 g sugar (corresponding to 2.9% of the flour weight) and 30 g salt.

Test bakings were carried out after the frozen dough samples had been store for 3, 7, 21 and 28 days.

The following results were obtained:

| | Volume: | | |
|---|---|---|---|
| | Before baking | After baking | Increase |
| After 3 days | 120 cm$^3$ | 200 cm$^3$ | 67% |
| After 7 days | 210 cm$^3$ | 250 cm$^3$ | 19% |
| After 21 days | 160 cm$^3$ | 105 cm$^3$ | −34% |
| After 28 days | 222 cm$^3$ | 213 cm$^3$ | −5% |

As it appears, the baking of the samples frozen for 21 and 28 days results in a volume decrease, meaning that the gluten components of the dough are extensively decomposed and the obtained baking result must be characterized as worthless, since it could not be baked through and was pasty in its interior whereas the surface became strongly dark colored.

I claim:

1. A method of producing a frozen, leavened laminated dough which is suitable for immediate baking when taken from the freezer comprising the steps of forming a dough essentially free of fermentable mono and disaccharides by mixing baking dough forming ingredients, other than fermentable mono and disaccharides, including flour, fat, water, yeast and amylase, said amylase including an amylase component which remains active at temperatures above 60 degrees Centigrade, to form a baking dough to which fermentable mono and disaccharides have not been added, folding and rolling said dough to effect lamination thereof, leavening said dough and freezing the leavened dough, said amylase being added in an amount to generate sufficient fermentable saccharides under leavening conditions for yeast leavening of the dough and said component thereof which remains active above 60 degrees Centigrade being added in an amount sufficient to increase browning of the dough during baking thereof.

2. A method as in claim 1 and wherein said amylase includes fungal alpha amylase and the amount thereof added to the dough is at least 3500 SKB units per kilogram of flour.

3. A method as in claim 1 and wherein said amylase includes an amylase component which becomes inactive at temperatures above about 60 degrees Centigrade and the amount thereof added to the dough is between 0.05 and 0.1 percent by weight of the flour in the dough.

4. A method as in claim 3 and wherein said amylase is fungal amylase.

5. A method as in claim 4 and wherein said amylase component which becomes inactive above 60 degrees Centigrade is amylase produced by *Aspergillus oryzae*.

6. A method as in claim 5 and wherein the amylase component which remains active above 60 degrees Centigrade is amyloglucosidase and the amount of amyloglucosidase added is at least 60 AGU units per kilogram of flour.

7. A method of producing a frozen, leavened laminated dough which is suitable for immediate baking when taken from the freezer comprising the steps of forming a dough essentially free of fermentable mono and disaccharides by mixing baking dough forming ingredients, other than fermentable mono and disaccharides, including flour, fat and water, yeast, alpha amylase and amyloglucosidase to form a dough to which fermentable mono and disaccharides have not been added, folding and rolling said dough to effect lamination thereof, leavening said dough and freezing the leavened dough, said alpha amylase being added in an amount sufficient to generate sufficient fermentable saccharides under leavening conditions for yeast leavening of the dough and said amyloglucosidase being added in an amount sufficient to increase browning of the dough during baking thereof.

8. A method as in claim 7 and wherein said amylase is a fungal amylase and the amount thereof added to the dough is at least 3500 SKB units per kilogram of flour and the amount of amyloglucosidase added to the dough is at least 60 AGU units per kilogram of flour.

9. A method as in claim 8 and wherein said amyloglucosidase is amyloglucosidase that becomes inactive at temperatures above about 85 degrees Centigrade.

10. A method as in claim 9 and wherein said amyloglucosidase is a fungal amyloglucosidase and the amount thereof added to the dough is between 0.1 and 0.2 percent by weight of the flour in the dough.

11. A method as in claim 10 and wherein said amyloglucosidase is produced by *Aspergillus niger*.

12. A frozen, dough product suitable for immediate baking when taken from the freezer comprising a yeast-leavened, laminated dough essentially free of fermentable mono- and disaccharides and comprised of flour, fat, water and amylase in an amount sufficient to generate sufficient fermentable saccharides under leavening conditions for yeast leavening thereof, said amylase including an amylase component which remains active at temperatures above 60 degrees Centigrade, said component being present in an amount which will increase browning of the dough during baking thereof.

13. A product as in claim 12 and wherein the amylase includes an amylase component which becomes inactive at temperatures above about 60 degrees Centigrade in the amount of at least 3500 SKB units per kilogram of flour.

14. A product as in claim 13 and wherein said amylase component which becomes inactive at temperatures above about 60 degrees Centigrade is alpha amylase.

15. A product as in claim 14 and wherein said alpha amylase is a fungal amylase produced by *Aspergillus oryzae*.

16. A product as in claim 12 and wherein said amylase component which remains active at temperatures above 60 degrees Centigrade is amyloglucosidase that becomes inactive at temperatures above about 85 degrees Centigrade, said amyloglucosidase being incorporated in said dough in an amount of at least 60 SKB units per kilogram of flour.

17. A product as in claim 16 and wherein said amyloglucosidase is a fungal amyloglucosidase.

18. A product as in claim 17 and wherein said amyloglucosidase is produced by *Aspergillus niger*.

19. A product as in claim 12 and wherein said product is a frozen Danish pastry dough product.

20. A product as in claim 12 and wherein said product is a frozen croissant dough product.

21. A pastry dough product suitable for frozen storage for baking at a later time comprising a laminated and shaped dough essentially free of fermentable mono- and disaccharides and comprised of flour, fat, water, yeast in an amount sufficient to leaven the dough and amylase in an amount sufficient to generate sufficient fermentable saccharides under leavening conditions for yeast leavening of the dough, said amylase including amyloglucosidase present in an amount sufficient to increase browning of the dough during baking thereof.

22. A pastry dough product as in claim 21 and wherein said amylase comprises fungal alpha amylase produced by *Aspergillus oryzae*.

23. A method of producing a frozen, leavened, laminated dough which is suitable for immediate baking when taken from the freezer comprising the steps of forming a dough essentially free of fermentable mono and disaccharides by mixing baking dough forming ingredients, other than fermentable mono and disaccharides, including flour, fat, water, yeast and amylase, to form a baking dough to which fermentable mono and disaccharides have not been added, folding and rolling said dough to effect lamination thereof, leavening said dough and freezing the leavened dough, said amylase being added in an amount to generate sufficient fermentable saccharides under leavening conditions for yeast leavening of the dough, wherein said amylase includes amyloglucosidase present in an amount sufficient to increase browning of the dough during baking thereof.

24. A method as in claim 23 and wherein said amylase is a fungal alpha amylase and the amount thereof added to the dough is at least 3500 SKB units per kilogram of flour and including the steps, prior to leavening, of cold rolling and folding said dough to form a laminated dough.

25. A frozen dough product suitable for immediate baking when taken from the freezer comprising a yeast-leavened, laminated dough essentially free of fermentable mono- and disaccharides and comprised of flour, fat, water, yeast and amylase in an amount sufficient to generate sufficient fermentable saccharides under leavening conditions for yeast leavening of the dough, wherein said amylase includes amyloglucosidase present in an amount sufficient to increase browning of the dough during baking thereof.

26. A product as in claim 25 and wherein said amylase comprises a fungal alpha amylase produced by *Aspergillus oryzae*.

27. A product as in claim 26 and wherein said product is a frozen Danish pastry dough product.

28. A product as in claim 26 and wherein said product is a frozen croissant dough product.

* * * * *